United States Patent
Naka et al.

(10) Patent No.: US 7,142,040 B2
(45) Date of Patent: Nov. 28, 2006

(54) STABILIZED POWER SUPPLY CIRCUIT

(75) Inventors: Takeshi Naka, Chuo-ku (JP); Takashi Maegawa, Chuo-ku (JP)

(73) Assignees: Device Engineering Co., Ltd., Tokyo (JP); Torex Device Co., Ltd., Tokyo (JP)

(*) Notice: Subject to any disclaimer, the term of this patent is extended or adjusted under 35 U.S.C. 154(b) by 335 days.

(21) Appl. No.: 10/809,936

(22) Filed: Mar. 26, 2004

(65) Prior Publication Data

US 2006/0146583 A1   Jul. 6, 2006

(30) Foreign Application Priority Data

Mar. 27, 2003 (JP) ............................. 2003-088958
Mar. 27, 2003 (JP) ............................. 2003-088959

(51) Int. Cl.
G05F 1/10 (2006.01)
H02M 3/18 (2006.01)

(52) U.S. Cl. ........................ 327/536; 363/60
(58) Field of Classification Search .............. 327/536; 363/59, 60
See application file for complete search history.

(56) References Cited

U.S. PATENT DOCUMENTS 5,483,434 A * 1/1996 Seesink .................. 363/60
5,680,300 A   10/1997 Szepesi et al.
6,359,797 B1 * 3/2002 Bayer et al. ............... 363/60
6,392,904 B1 * 5/2002 Bayer et al. ............... 363/59

FOREIGN PATENT DOCUMENTS

| JP | 6-351229 A | 12/1994 |
| JP | 8-88550 A | 4/1996 |
| JP | 10-304654 A | 11/1998 |
| JP | 10-313570 A | 11/1998 |
| JP | 2001-45740 A | 2/2001 |
| JP | 2003-23770 A | 1/2003 |

* cited by examiner

Primary Examiner—Shawn Riley
(74) Attorney, Agent, or Firm—Sughrue Mion, PLLC

(57) ABSTRACT

A stabilized power supply circuit includes a charge pump power supply circuit including four switching elements and a capacitor, and an error amplifier comparing the output voltage of the charge pump power supply circuit and a reference voltage and outputting an error signal on the basis of the difference therebetween. A current source is connected in series to the gate of a switching element formed of a MOSFET. The period during which electric charge is discharged from the gate is controlled in accordance with the error signal in order to maintain the output voltage constant.

6 Claims, 8 Drawing Sheets

STABILIZED POWER SUPPLY CIRCUIT

BACKGROUND OF THE INVENTION

1. Field of the Invention

The present invention relates to a stabilized power supply circuit, and more particularly to a stabilized power supply circuit that is suitable for a charge pump power supply circuit.

2. Description of the Related Art

A charge pump power supply circuit is one of known power supply circuits. FIG. 1 is a circuit diagram showing a typical example of a charge pump called a doubler, As shown in FIG. 1, the charge pump includes four switching elements 1, 2, 3, and 4, and a single capacitor 5. The charge pump doubles an input voltage $V_{in}$, which is an output voltage of a power source 6, to thereby obtain an output voltage $V_{out}$.

Specifically, when the switching elements 1 and 2 are turned on at a certain period, the input voltage $V_{in}$ is applied to the capacitor 5, whereby the capacitor 5 is charged. During this period, the switching elements 3 and 4 are maintained off. As a result, the voltage between the opposite ends of the capacitor 5 increases to the input voltage $V_{in}$. In a subsequent period, the switching elements 3 and 4 are turned on, and the switching elements 1 and 2 are turned off. As a result of this operation, the input voltage $V_{in}$ is superposed on the voltage ($V_{in}$) between the opposite ends of the capacitor 5 via the switching element 4, whereby the voltage between the opposite ends of the capacitor 5 becomes two times the input voltage $V_{in}$, and is output via the switching element 3 to an output terminal 7, as the output voltage $V_{out}$.

In general, each of the switching elements 1 to 4 is formed of a MOSFET, and is switched by means of clock pulses output from a clock pulse generation circuit (not shown). Further, a smoothing capacitor 8 is provided in order to remove pulsation components from the output voltage $V_{out}$ to thereby stabilize the same.

In such a charge pump power supply circuit, although the output voltage $V_{out}$ is stabilized by means of the smoothing capacitor 8, its stability is insufficient; e.g., the output voltage $V_{out}$ drops when large load current flows, In other words, essentially, the above-described charge pump power supply circuit does not function as a switching regulator or stabilized power supply circuit.

In order to solve the above-described problem, there has been proposed a stabilized power supply circuit which utilizes a charge pump power supply circuit whose output voltage $V_{out}$ is stabilized. FIG. 2 shows the proposed stabilized power supply circuit. As shown in FIG. 2, in the stabilized power supply circuit, a voltage representing the output voltage $V_{out}$ (in this example, a voltage obtained through division of the output voltage $V_{out}$ by resistances $R_1$ and $R_2$ of resistors 9 and 10) is compared with a predetermined reference voltage $V_{ref}$ to thereby obtain an error signal corresponding to the difference therebetween. The thus-obtained error signal is used to control the on resistance of the switching element 4, which is formed of a MOS transistor. That is, through control of the on resistance, the voltage that is superposed on the voltage of the capacitor 5 via the switching element 4 is controlled so as to maintain the output voltage $V_{out}$ at a constant level.

More specifically, when the switching element 4, together with the switching element 3, is turned off by means of a clock pulse of the charge pump (the switching elements 1 and 2 are turned on), a switching element 11 is turned on, and a switching element 12 is turned off.

Meanwhile, when the switching element 4 is turned on, the switching element 11 is turned off, and the switching element 12 is turned on by means of the clock pulse. As a result, the error signal, which is the output voltage of an error amplifier 13, is applied to the gate of the switching element 4 via the switching element 12. However, the on resistance of the switching element 4 varies in accordance with the applied voltage. That is, the on resistance of the switching element 4 is determined in accordance with the deviation, and a voltage corresponding to the on resistance (the smaller the on resistance, the higher the voltage) is superposed on the voltage of the capacitor 5, whereby a stepped up voltage is output as the output voltage $V_{out}$.

In this manner, the output voltage $V_{out}$ is maintained at a constant level, whereby the charge pump circuit functions as a switching regulator or stabilized power supply circuit.

Although the stabilized power supply circuit shown in FIG. 2 can stabilize the output voltage $V_{out}$ of the charge pump power supply circuit, the circuit has the following problems.

First, the switching element 4 is driven by means of a voltage corresponding to the error signal and through changeover of the switching elements 11 and 12, and thus, the output current of the switching element 4 varies abruptly, whereby the capacitor 5 is charged abruptly. Current stemming from the charging flows toward the output terminal 7 via the switching element 3 and is superposed on the output current as a ripple. As a result, the quality of the output voltage of the stabilized power supply circuit deteriorates. Second, since the error amplifier 13 must drive the switching element 4, which serves as a load thereof, at constant voltage, the load of the error amplifier 13 increases, and thus, the error amplifier 13 must be of large capacity.

Moreover, the stabilized power supply circuit shown in FIG. 2 encounters a problem of wasteful consumption of electrical power in the case where, irrespective of its load state (the magnitude of load), the switching elements 1, 2, 3, and 4 are always turned on and off at predetermined intervals by means of clock pulses so as to achieve charge pump operation. That is, when the stabilized power supply circuit is caused to achieve charge pump operation, it naturally consumes electrical power. However, in a charge pump of the above-described type, the switching elements 1, 2, 3, and 4 of relatively large capacity must be turned on and off, so that the consumed electrical power increases accordingly. For example, in the case where charge pump operation is continuously performed even in a standby mode of a camera to which electrical power is required to be supplied instantaneously in the form of a pulse, a large amount of electrical power is wastefully consumed by the charge pump operation during a greater portion of the standby period in which the instantaneous electrical power is not required.

SUMMARY OF THE INVENTION

In view of the foregoing, a first object of the present invention is to provide a stabilized power supply circuit utilizing a charge pump power supply circuit which can remove ripple variations from output current and which can stabilize the output current by use of an element of small capacity.

A second object of the present invention is to provide a stabilized power supply circuit utilizing a charge pump power supply circuit which stops its charge pump operation during light load periods to thereby reduce consumption of electrical power, which can remove ripple variations from output current, and which can stabilize the output current by use of an element of small capacity.

In order to achieve the first object, the present invention provides a stabilized power supply circuit comprising a charge pump power supply circuit including a plurality of switches and a capacitor, wherein, through combination of selective on and off operations of the individual switches, the charge pump power supply circuit accumulates electric charge in the capacitor and outputs, as output voltage, voltage generated upon accumulation of electric charge; and an error amplifier comparing the output voltage and a predetermined reference voltage and outputting an error signal on the basis of the difference between the output voltage and the reference voltage, wherein at least one of the switches of the charge pump power supply circuit is constituted by a field effect transistor; and a period during which electric charge is charged into or discharged from a gate of the field effect transistor is controlled in accordance with the error signal in order to maintain the output voltage constant.

Preferably, a current source is connected in series to the gate of the field effect transistor; and the period during which electric charge is charged into or discharged from the gate is controlled by controlling the current source in accordance with the error signal output from the error amplifier. Preferably, the current source is formed of a transistor. More preferably, the current source is formed of a MOS-type field effect transistor.

In the stabilized power supply circuit of the present invention, at least one of the switches of the charge pump power supply circuit is constituted by a field effect transistor; and a period during which electric charge is charged into or discharged from a gate of the field effect transistor is controlled in accordance with the error signal. Therefore, after changeover of the switch for controlling the gate, the on resistance of the field effect transistor can be gradually reduced from infinity to a predetermined value. As a result, no ripple is produced in the output current of the stabilized power supply circuit, whereby the output voltage can be stabilized at a constant level. When a current source is used as means for controlling the gate current, desired control can be easily performed.

When the current source is formed of a transistor, the capacity of the current source, which serves as a load of the error amplifier, can be reduced, whereby the size and cost of the error amplifier can be reduced. When the current source is formed of a MOS-type field effect transistor, no current flows therethrough when the transistor is in an off state, thereby contributing to reduction of consumed electrical power, and the current source can be easily fabricated in the form of an IC.

In order to achieve the second object, the present invention provides a stabilized power supply circuit comprising a charge pump power supply circuit including a plurality of switches and a capacitor, wherein, through combination of selective on and off operations of the individual switches by means of clock pulses, the charge pump power supply circuit accumulates electric charge in the capacitor and outputs, as output voltage, voltage generated upon accumulation of electric charge; and an error amplifier comparing the output voltage and a first reference voltage and outputting an error signal on the basis of the difference between the output voltage and the first reference voltage, wherein at least one of the switches of the charge pump power supply circuit is controlled in accordance with the error signal in order to maintain the output voltage constant; and the voltage of the error signal is compared with a second reference voltage, and when the difference between the voltage of the error signal and the second reference voltage is equal to or less than a predetermined value, the charge pump operation performed through selective on and off operations of the individual switches by means of the clock pulses is stopped.

In order to achieve the second object, the present invention provides a stabilized power supply circuit comprising a charge pump power supply circuit including a plurality of switches and a capacitor, wherein, through combination of selective on and off operations of the individual switches by means of clock pulses, the charge pump power supply circuit accumulates electric charge in the capacitor and outputs, as output voltage, voltage generated upon accumulation of electric charge; and an error amplifier comparing the output voltage and a first reference voltage and outputting an error signal on the basis of the difference between the output voltage and the first reference voltage, wherein at least one of the switches of the charge pump power supply circuit is constituted by a field effect transistor; and a period during which electric charge is charged into or discharged from a gate of the field effect transistor is controlled in accordance with the error signal in order to maintain the output voltage constant; and the voltage of the error signal is compared with a second reference voltage, and when the difference between the voltage of the error signal and the second reference voltage is equal to or less than a predetermined value, the charge pump operation performed through selective on and off operations of the individual switches by means of the clock pulses is stopped.

Preferably, a current source is connected in series to the gate of the field effect transistor; and the period during which electric charge is charged into or discharged from the gate is controlled by controlling the current source in accordance with the error signal output from the error amplifier. Preferably, the current source is formed of a transistor, More preferably, the current source is formed of a MOS-type field effect transistor.

In the stabilized power supply circuit of the present invention, an error amplifier outputs an error signal on the basis of the output voltage of the charge pump power supply circuit and a first reference voltage; and the voltage of the error signal is compared with a second reference voltage, and when the difference between the voltage of the error signal and the second reference voltage is equal to or less than a predetermined value, the charge pump operation is stopped. This configuration enables the charge pump circuit to be operated only when necessary, to thereby avoid the wasteful consumption of electrical power in the charge pump, which consumes a relatively large amount of electrical power.

When the current source is formed of a transistor, the capacity of the current source, which serves as a load of the error amplifier, can be reduced, whereby the size and cost of the error amplifier can be reduced. When the current source is formed of a MOS-type field effect transistor, no current flows therethrough when the transistor is in an off state, thereby contributing to reduction of consumed electrical power, and the current source can be easily fabricated in the form of an IC.

DESCRIPTION OF THE PREFERRED EMBODIMENTS

Embodiments of the present invention will now be described in detail with reference to the drawings.

Figure 1:
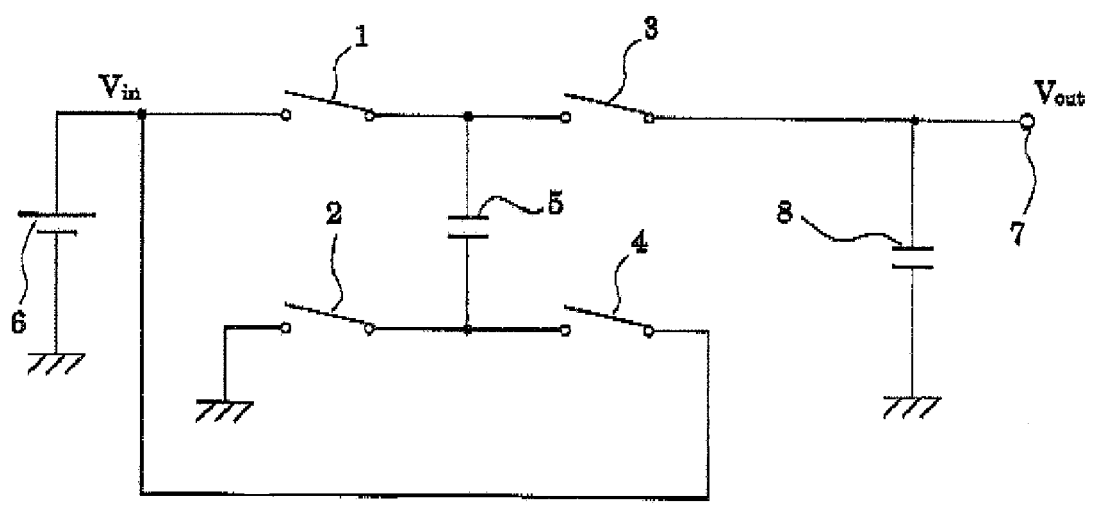
FIG. 1 is a circuit diagram showing a charge pump power supply circuit.
Figure 2:
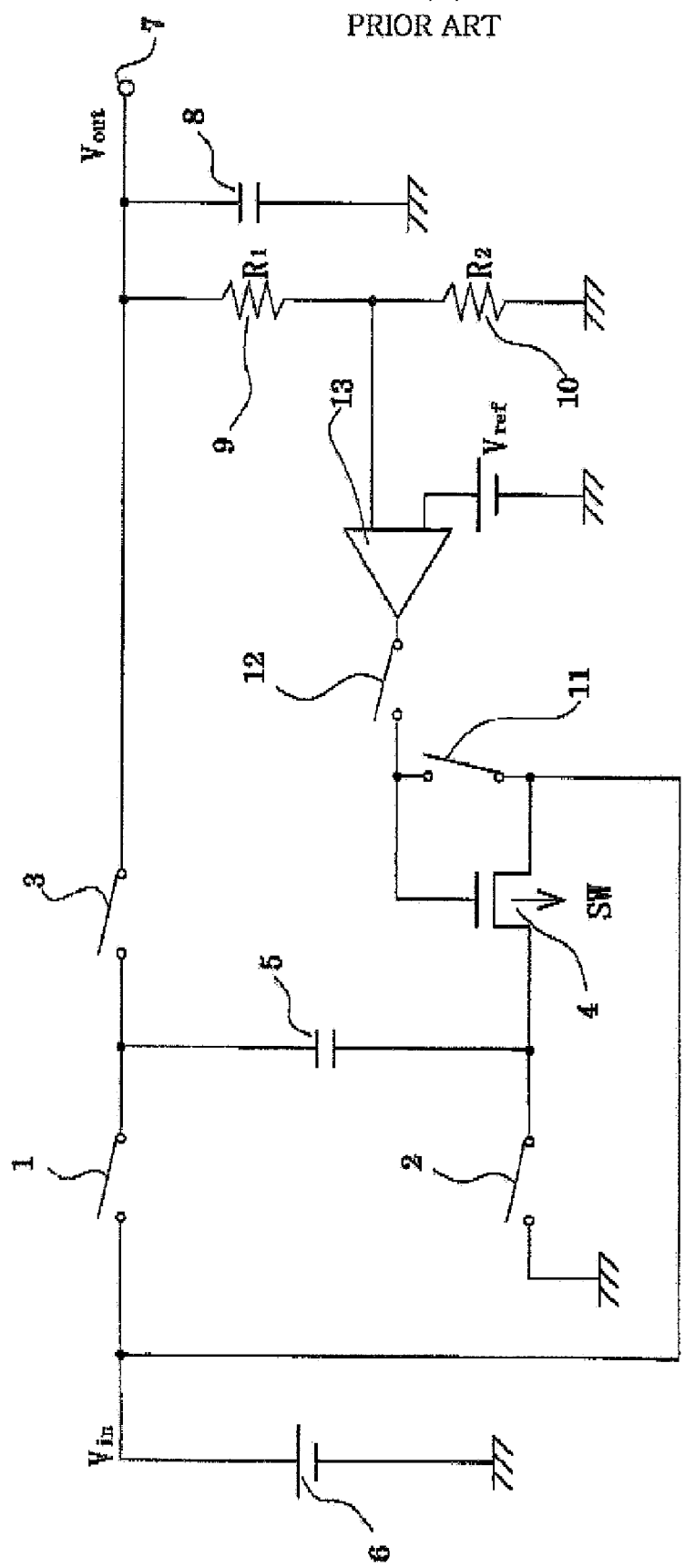
FIG. 2 is a circuit diagram showing a conventional stabilized power supply circuit utilizing a charge pump power supply circuit.
Figure 3:
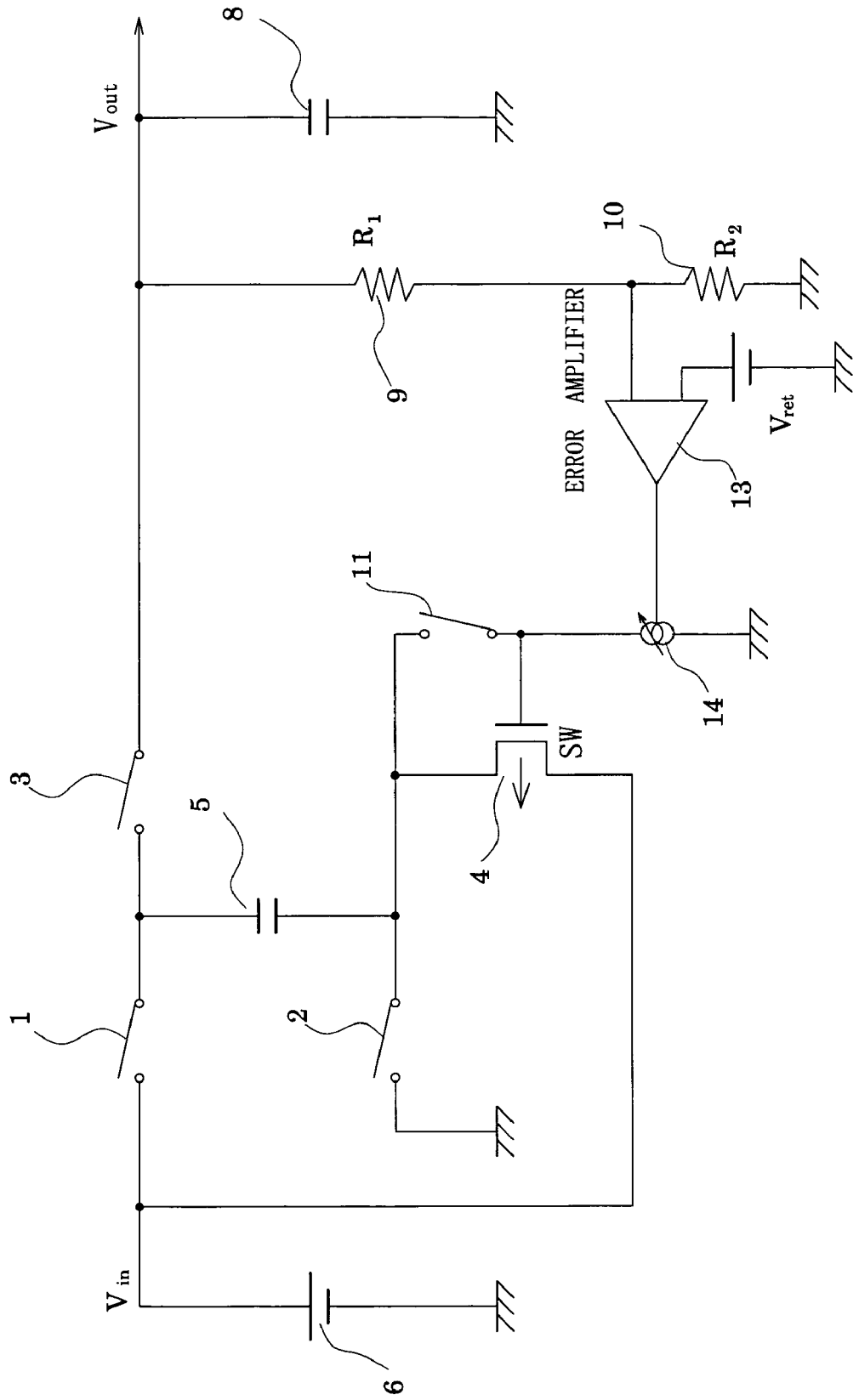
FIG. 3 is a circuit diagram showing a stabilized power supply circuit according to a first embodiment of the present invention.

FIG. 3 is a circuit diagram showing a stabilized power supply circuit according to a first embodiment of the present invention. The stabilized power supply circuit shown in FIG. 3 differs from the stabilized power supply circuit shown in FIG. 2 only in the point that the load of the error amplifier 13 is replaced with a different element. Therefore, those elements identical with those shown in FIG. 2 are denoted by the same reference numerals, and repeated descriptions are omitted.

As shown in FIG. 3, the load of the error amplifier 13 in the present embodiment is a current source 14, which is connected in series to the gate of a MOSFET (P type in the present example), which constitutes the switching element 4. That is, a period during which electric charge is discharged from the gate of the MOSFET, which constitutes the switching element 4, is controlled by controlling the current source 14 in accordance with the voltage of the error signal.

In the circuit shown in FIG. 3, during the on/off operations of the switching elements 1 to 4 performed by means of clock pulses, the switching element 11 is turned off, along with the switching elements 1 and 2, in synchronism with the switching of the switching element 3 to the on state (this mode will be referred to as "ON mode" of the switching elements 3 and 4). During this "ON mode," the charge accumulated in the gate of the switching element 4 (MOSFET) is discharged through operation of the current source 14. The time required for the discharge is determined in accordance with the voltage of the error signal. That is, the higher the voltage of the error signal (the greater the error), the shorter the period within which the discharge is completed. As a result, the higher the voltage of the error signal, the higher the rate at which the output voltage $V_{out}$ increases to thereby stabilize the output voltage.

Figure 4:
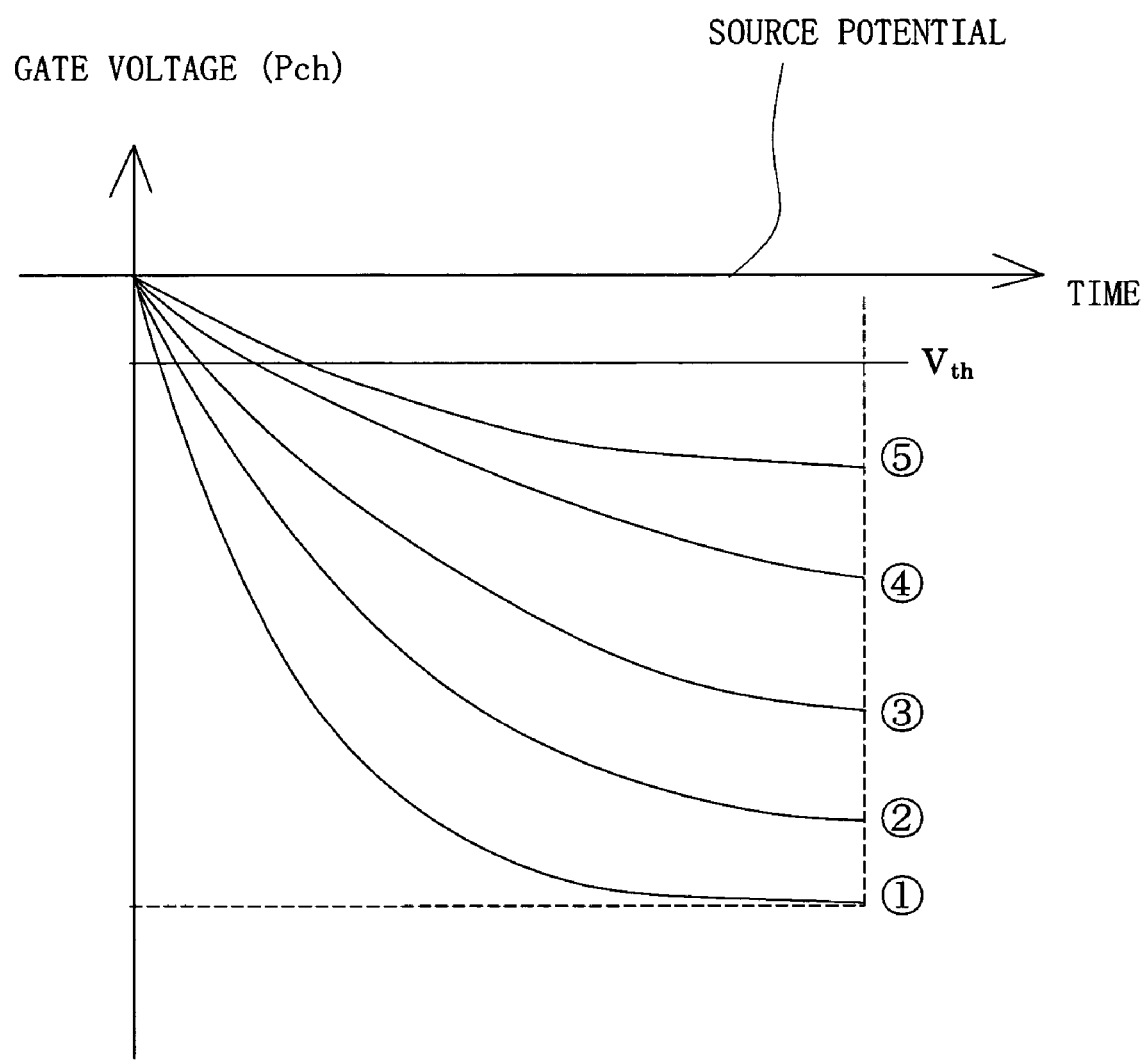
FIG. 4 is a graph showing the gate voltage characteristic of a switching element attained through action of a current source shown in FIG. 3.

FIG. 4 is a graph showing the gate voltage characteristic of the MOSFET (p type), which constitutes the switching element 4 of the present embodiment, in the above-described "ON mode." The gate voltage characteristic shown in FIG. 4, in which gate current serves as a parameter, shows the case where the gate current is reduced (i.e., the discharge period is increased) in the sequence of ①, ②, ③, ④, and ⑤. Notably, in the graph, $V_{th}$ represents a threshold voltage.

As can be seen from the graph of FIG. 4, although the switching element 4 is turned on in the "ON mode," the gate voltage gradually changes. In the stabilized power supply circuit shown in FIG. 2, as a result of abrupt change of the gate voltage of the switching element 4 to a constant voltage corresponding to the voltage of the error signal, the output current contains ripples. In contrast, in the stabilized power supply circuit according to the present embodiment, immediately after switching to the "ON mode," the discharge of electric charge from the gate of the switching element 4 is started, and the on resistance of the FET, which is infinity at the beginning of the discharge, is gradually lowered, to thereby gradually increase the output current of the switching element 4. The rate of change for the output current increases with the voltage of the error signal.

Accordingly, the output current of the stabilized power supply circuit in the "ON mode" changes in accordance with a change in the output current of the switching element 4; i.e., does not change abruptly and does not produce ripples.

Figure 5:
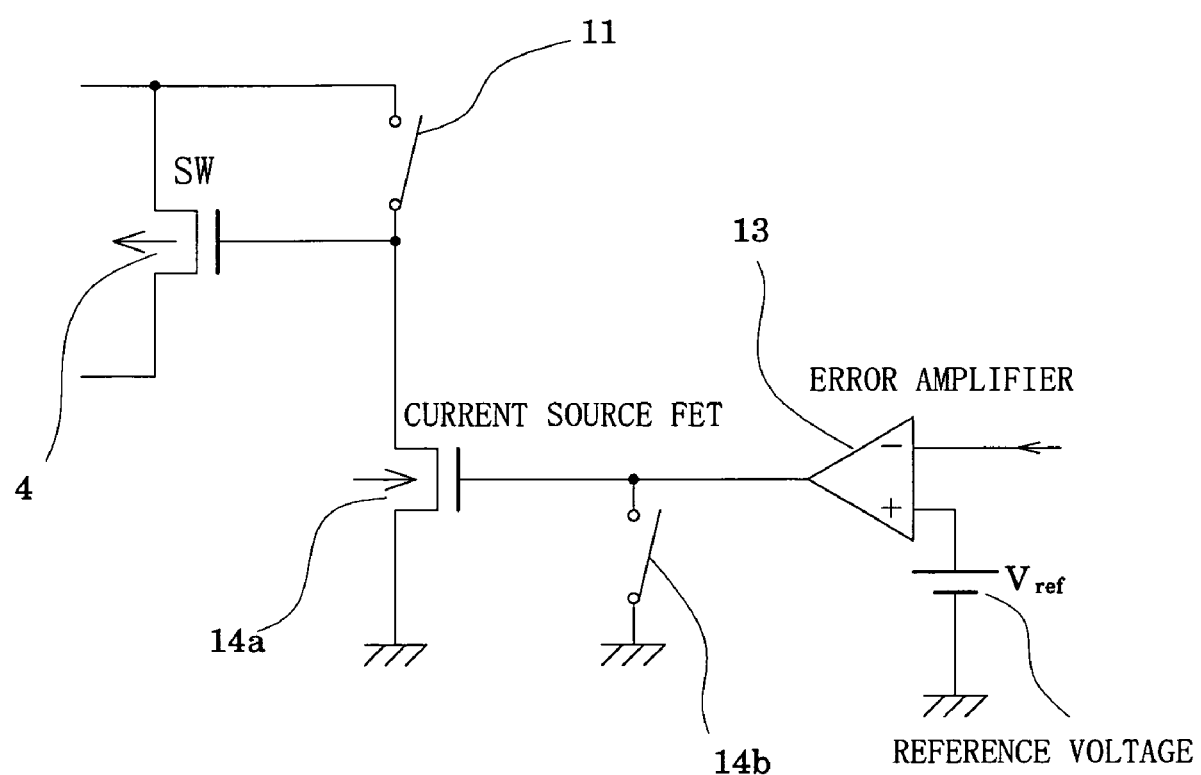
FIG. 5 is a circuit diagram relating to the first embodiment and specifically showing the current source and neighboring portions of the stabilized power supply circuit shown in FIG. 3.

FIG. 5 shows a more specific example of the current source 14 shown in FIG. 3. Notably, those elements identical with those shown in FIG. 3 are denoted by the same reference numerals, and repeated descriptions are omitted. As shown in FIG. 5, the current source 14 of the present example is formed of an N-type MOSFET 14a, and the on/off operation of the MOSFET 14a is controlled by means of a switching element 14b. The switching element 14b performs on/off operation in synchronism with the switching element 11, and enters an off state in the "ON mode" to thereby operate the MOSFET 14a. Thus, the gate current of the switching element 4 is controlled in accordance with the voltage of the error signal.

Notably, in the example shown in FIG. 5, the MOSFET 14a is used as an element for constituting the current source 14. However, needless to say, the current source 14 can be formed from a bipolar transistor. In this case, however, there arises a problem of larger loss, because a resistor must be connected in series to the emitter of the bipolar transistor, and base current always flows through the bipolar transistor.

In the above-described embodiment, the gate of the switching element 4 is controlled by use of an error signal. However, the switching element to be controlled is not limited thereto, Any one of the gates of the switching elements 1 to 3 may be controlled, and two or more of the gates of the switching elements 1 to 3 may be controlled. Accordingly, the charge pump power supply circuit is not limited to a doubler. No special limitations are imposed on the charge pump power supply circuit, so long as the charge pump power supply circuit includes a plurality of switches and a capacitor, and so long as, through combination of selective on and off operations of the individual switches, electric charge is accumulated in the capacitor, and voltage generated upon accumulation of electric charge is output as output voltage. Further, although the switching element 4 shown in FIG. 5 is constituted by a P-type MOSFET, it may also be constituted by an N-type MOSFET. However, when an N-type MOSFET is employed, a transistor of the current source 14 to be combined with the FET must be of a P-type, and the above-described configuration must be modified in such a manner that the current source 14 charges the gate of the N-type MOSFET in accordance with the error signal so as to gradually decrease the on resistance of the FET.

Figure 6:
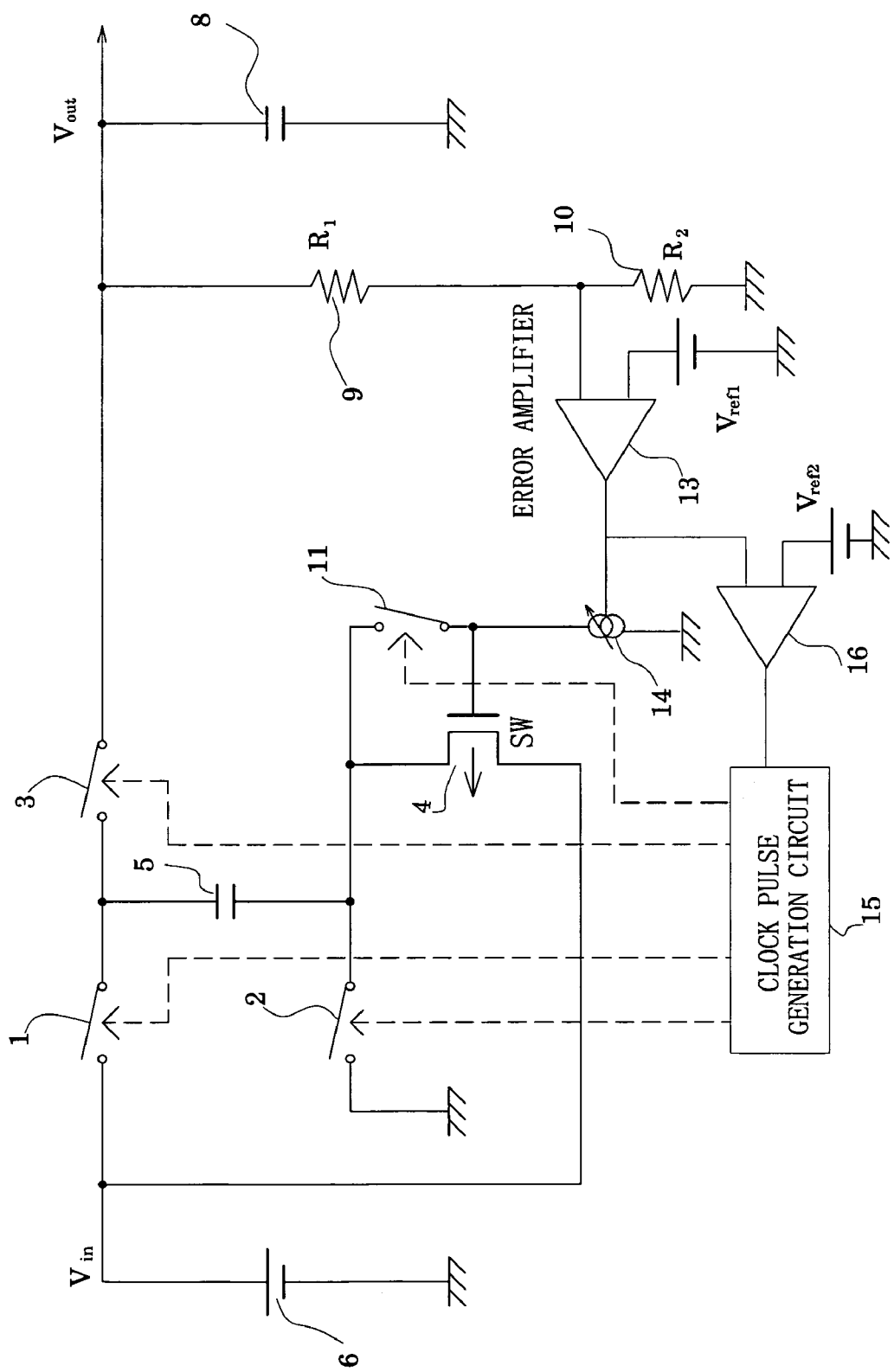
FIG. 6 is a circuit diagram showing a stabilized power supply circuit according to a second embodiment of the present invention.

FIG. 6 is a circuit diagram showing a stabilized power supply circuit according to a second embodiment of the present invention. The stabilized power supply circuit shown in FIG. 6 differs from the stabilized power supply circuit shown in FIG. 2 only in the point that the load of the error amplifier 13 is replaced with a different element, and operation of a clock pulse generation circuit 15 is controlled by use of the output signal of the error amplifier 13. Therefore, those elements identical with those shown in FIG. 2 are denoted by the same reference numerals, and repeated descriptions are omitted.

As shown in FIG. 6, the load of the error amplifier 13 in the present embodiment is a current source 14, which is connected in series to the gate of a MOSFET (P type in the present example), which constitutes the switching element 4. That is, a period during which electric charge is discharged from the gate of the MOSFET, which constitutes the switching element 4, is controlled by controlling the current source 14 in accordance with the voltage of the error signal.

In the circuit shown in FIG. 6, during the on/off operations of the switching elements 1 to 4 performed by means of clock pulses, which are the output signals of the clock pulse generation circuit 15, the switching element 11 is turned off, along with the switching elements 1 and 2, in synchronism with the switching of the switching element 3 to the on state (this mode will be referred to as an "ON mode" of the switching elements 3 and 4). During this "ON mode," the electric charge accumulated in the gate of the switching element 4 (MOSFET) is discharged through operation of the current source 14. The time required for the discharge is determined in accordance with the voltage of the error signal. That is, the greater the difference between the output voltage $V_{out}$ and a first reference voltage $V_{ref1}$, the shorter the period within which the discharge is completed. As a result, the higher the voltage of the error signal, the higher the rate at which the output voltage $V_{out}$ increases to thereby stabilize the output voltage.

A comparator 16 compares the error signal, which is the output signal of the error amplifier 13, with a second reference voltage $V_{ref2}$. When the difference therebetween is equal to or less than a predetermined value, the comparator 16 stops the operation of the clock pulse generation circuit 15, to thereby stop the charge pump operation, which is performed through on/off operations of the switching element 1 to 4 by means of clock pulses; i.e., the output signals from the clock pulse generation circuit 15. That is, the charge pump operation is stopped during light load periods in which variation in the output voltage $V_{out}$ is small. This enables the charge pump circuit to be operated only when necessary, to thereby avoid wasteful consumption of electrical power in the charge pump, which consumes a relatively large amount of electrical power.

Figure 7:
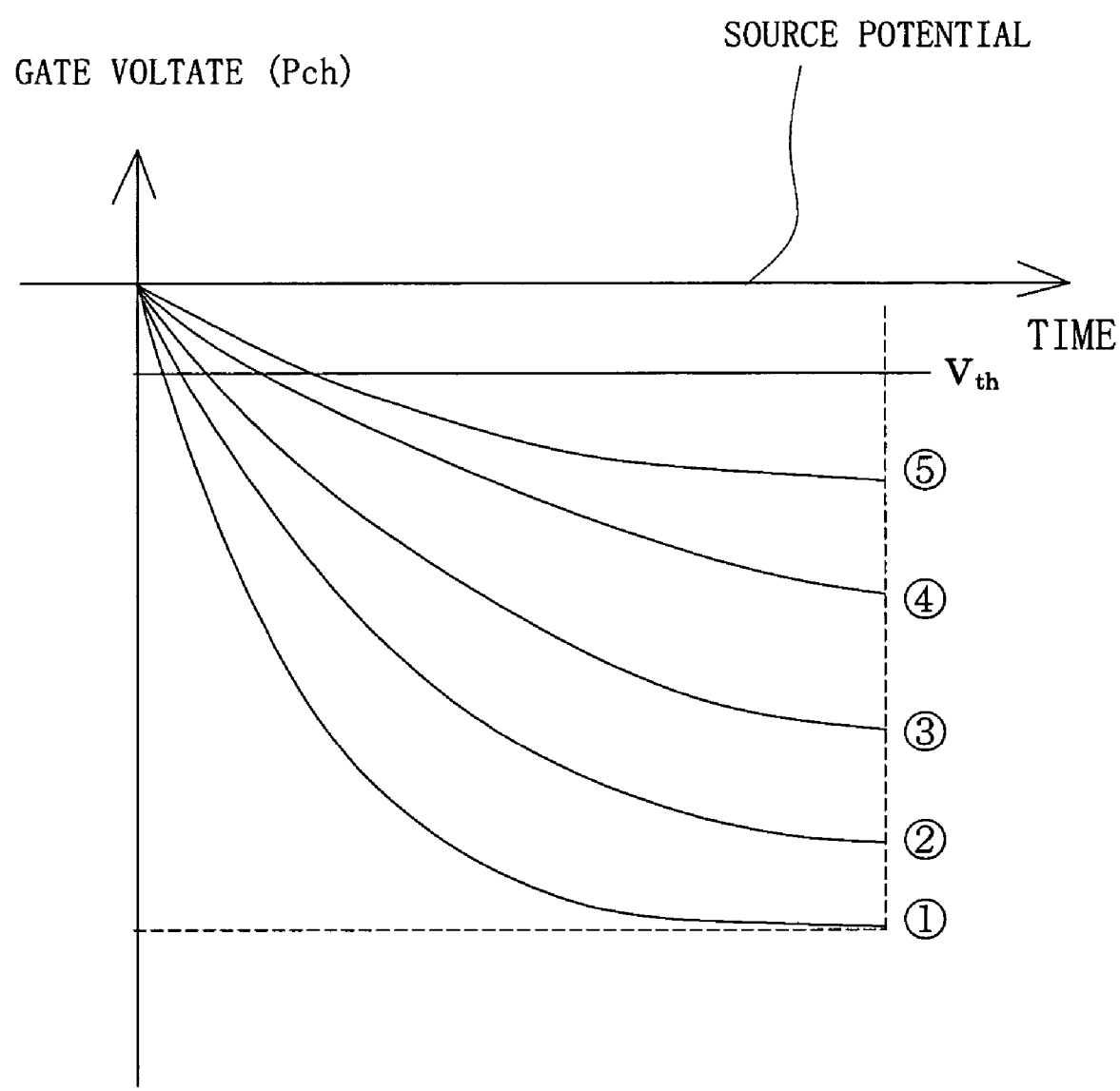
FIG. 7 is a graph showing the gate voltage characteristic of A switching element attained through action of a current source shown in FIG. 6.

FIG. 7 is a graph showing the gate voltage characteristic of the MOSFET (P type), which constitutes the switching element 4 of the present embodiment, in the above-described "ON mode." The gate voltage characteristic shown in FIG. 7, in which gate current serves as a parameter, shows the case where the gate current is reduced (i.e., the discharge period is increased) in the sequence of ①, ②, ③, ④, and ⑤. Notably, in the graph, $V_{th}$ represents a threshold voltage.

As can be seen from the graph of FIG. 7, although the switching element 4 is turned on in the "ON mode," the gate voltage gradually changes. In the stabilized power supply circuit shown in FIG. 2, as a result of abrupt change of the gate voltage of the switching element 4 to a constant voltage corresponding to the voltage of the error signal, the output current contains ripples. In contrast, in the stabilized power supply circuit according to the present embodiment, immediately after switching to the "ON mode," the discharge of charge from the gate of the switching element 4 is started, and the on resistance of the FET, which is infinity at the beginning of the discharge, is gradually lowered, to thereby gradually increase the output current of the switching element 4. The change rate of the output current increases with the voltage of the error signal.

Accordingly, the output current of the stabilized power supply circuit in the "ON mode" changes in accordance with a change in the output current of the switching element 4; i.e., does not change abruptly and does not produce ripples.

Figure 8:
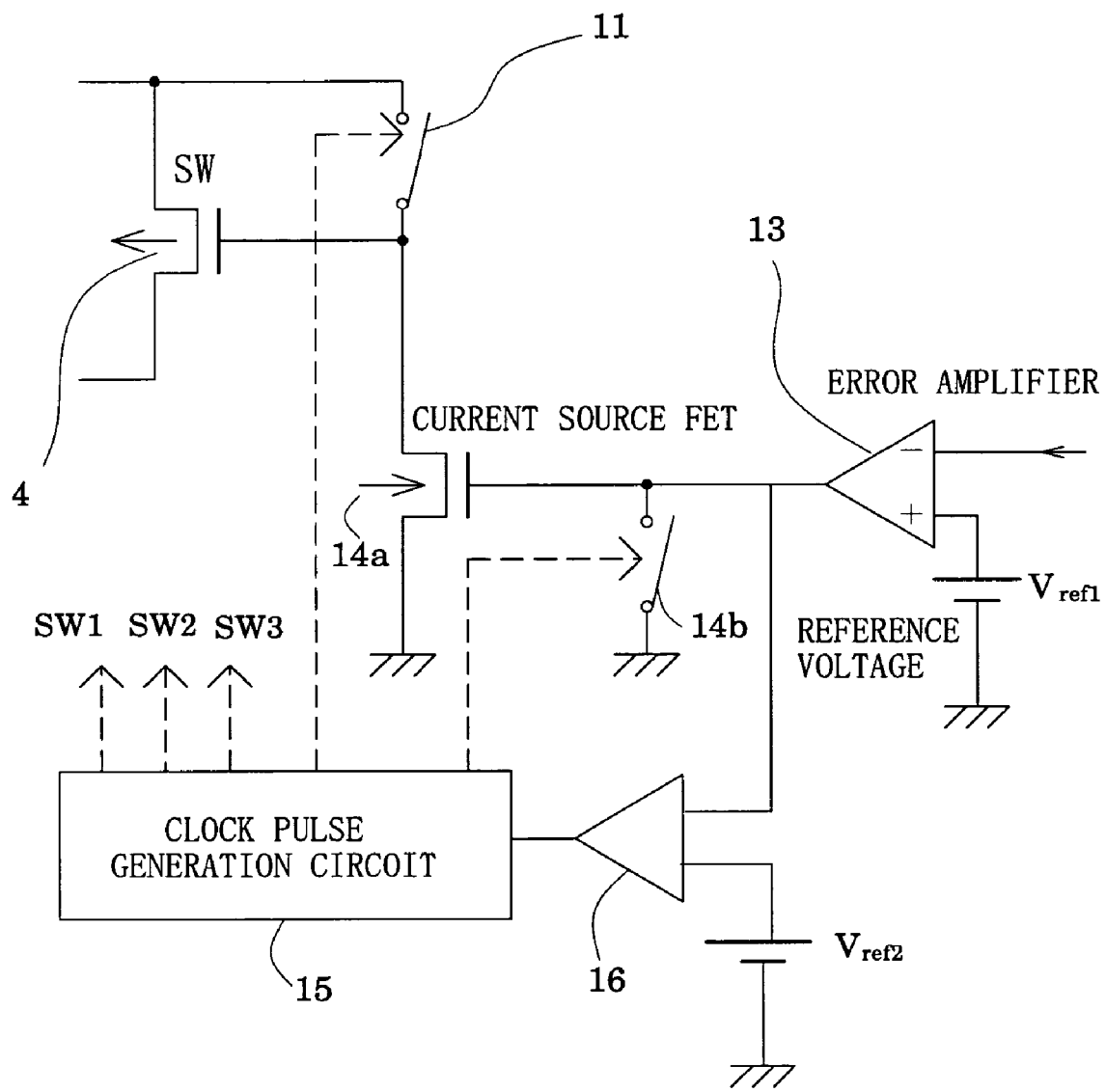
FIG. 8 is a circuit diagram relating to the second embodiment and specifically showing the current source and neighboring portions of the stabilized power supply circuit shown in FIG. 6.

FIG. 8 shows a more specific example of the current source 14 shown in FIG. 6. Notably, those elements identical with those shown in FIG. 6 are denoted by the same reference numerals, and repeated descriptions are omitted.

As shown in FIG. 8, the current source 14 of the present example is formed of an N-type MOSFET 14a, and the on/off operation of the MOSFET 14a is controlled by means of a switching element 14b. The switching element 14b performs on/off operation in synchronism with the switching element 11, and enters an off state in the "ON mode" to thereby operate the MOSFET 14a. Thus, the gate current of the switching element 4 is controlled in accordance with the voltage of the error signal.

Notably, in the example shown in FIG. 8, the MOSFET 14a is used as an element for constituting the current source 14. However, needless to say, the current source 14 can be formed from a bipolar transistor. In this case, however, there arises a problem of larger loss, because a resistor must be connected in series to the emitter of the bipolar transistor, and base current always flows through the bipolar transistor.

In the above-described embodiment, the gate of the switching element 4 is controlled by use of an error signal. However, the switching element to be controlled is not limited thereto. Any one of the gates of the switching elements 1 to 3 may be controlled, and two or more of the gates of the switching elements 1 to 3 may be controlled. Accordingly, the charge pump power supply circuit is not limited to a doubler. No special limitations are imposed on the charge pump power supply circuit, so long as the charge pump power supply circuit includes a plurality of switches and a capacitor, and so long as, through combination of selective on and off operations of the individual switches, electric charge is accumulated in the capacitor, and voltage generated upon accumulation of electric charge is output as output voltage. Further, although the switching element 4 shown in FIG. 6 is constituted by a P-type MOSFET, it may also be constituted by an N-type MOSFET. However, when an N-type MOSFET is employed, a transistor of the current source 14 to be combined with the FET must be of a P-type, and the above-described configuration must be modified in such a manner that the current source 14 charges the gate of the N-type MOSFET in accordance with the error signal so as to gradually decrease the on resistance of the FET.

In the above-described embodiment, when the difference or deviation voltage, which is the output signal of the comparator 16, is equal to or less than a predetermined value, the comparator 16 directly controls the clock pulse generation circuit 15 to thereby stop the generation of clock pulses by the clock pulse generation circuit 15. However, the circuit is not necessarily required to be configured as described above, so long as the circuit is configured to stop the charge pump operation upon satisfaction of the predetermined condition. Accordingly, the circuit may be configured to control the supply of clock pulses from the clock pulse generation circuit 15 to the switching elements 1 to 4 by use of the output signal of the comparator 16. Moreover, the means for controlling the charge pump operation, such as the comparator 16 connected to the output side of the error amplifier 13, may be provided on the output side of the error amplifier 13 shown in FIG. 2, whereby the same operation and effects can be achieved.

What is claimed is:

1. A stabilized power supply circuit comprising:
   a charge pump power supply circuit including a plurality of switches and a capacitor, wherein, through combination of selective on and off operations of the individual switches, the charge pump power supply circuit accumulates electric charge in the capacitor and outputs, as output voltage, voltage generated upon accumulation of electric charge; and
   an error amplifier comparing the output voltage and a predetermined reference voltage and outputting an error signal on the basis of the difference between the output voltage and the reference voltage, wherein
   at least one of the switches of the charge pump power supply circuit is constituted by a field effect transistor; a current source is connected in series to a gate of the field effect transistor; and the current source is controlled in accordance with the error signal output from the error amplifier, whereby a period during which electric charge is charged into or discharged from the gate is controlled in accordance with the error signal in order to maintain the output voltage constant.

2. A stabilized power supply circuit according to claim 1, wherein a current source is formed of a transistor.

3. A stabilized power supply circuit according to claim 2, wherein the current source is formed of a MOS-type field effect transistor.

4. A stabilized power supply circuit comprising:
   a charge pump power supply circuit including a plurality of switches and a capacitor, wherein, through combination of selective on and off operations of the individual switches by means of clock pulses, the charge pump power supply circuit accumulates electric charge in the capacitor and outputs, as output voltage, voltage generated upon accumulation of electric charge; and
   an error amplifier comparing the output voltage and a first reference voltage and outputting an error signal on the basis of the difference between the output voltage and the first reference voltage, wherein
   at least one of the switches of the charge pump power supply circuit is constituted by a field effect transistor; a current source is connected in series to a gate of the field effect transistor; and the current source is controlled in accordance with the error signal output from the error amplifier, whereby a period during which electric charge is charged into or discharged from the gate is controlled in accordance with the error signal in order to maintain the output voltage constant; and
   the voltage of the error signal is compared with a second reference voltage, and when the difference between the voltage of the error signal and the second reference voltage is equal to or less than a predetermined value, the charge pump operation performed through selective on and off operations of the individual switches by means of the clock pulses is stopped.

5. A stabilized power supply circuit according to claim 4, wherein the current source is formed of a transistor.

6. A stabilized power supply circuit according to claim 5, wherein the current source is formed of a MOS-type field effect transistor.

* * * * *